United States Patent
Laughlin

(10) Patent No.: US 10,833,774 B2
(45) Date of Patent: Nov. 10, 2020

(54) EMBEDDED FIBER OPTIC SENSOR SYSTEM

(71) Applicant: The Boeing Company, Chicago, IL (US)

(72) Inventor: Brian Dale Laughlin, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/237,869

(22) Filed: Jan. 2, 2019

(65) Prior Publication Data

US 2020/0213012 A1    Jul. 2, 2020

(51) Int. Cl.
| | |
|---|---|
| *H04B 10/80* | (2013.01) |
| *B64F 5/40* | (2017.01) |
| *B64D 45/00* | (2006.01) |
| *G07C 5/08* | (2006.01) |
| *H04B 10/25* | (2013.01) |
| *H04B 10/50* | (2013.01) |
| *H04B 10/66* | (2013.01) |
| *H04L 29/08* | (2006.01) |
| *G01M 5/00* | (2006.01) |

(52) U.S. Cl.
CPC ............ *H04B 10/80* (2013.01); *B64D 45/00* (2013.01); *B64F 5/40* (2017.01); *G07C 5/0808* (2013.01); *H04B 10/25* (2013.01); *H04B 10/50* (2013.01); *H04B 10/66* (2013.01); *H04L 67/12* (2013.01); *B64D 2045/009* (2013.01); *B64D 2045/0085* (2013.01); *G01M 5/0033* (2013.01); *G01M 5/0041* (2013.01)

(58) Field of Classification Search
CPC ........ H04B 10/80; H04B 10/25; H04B 10/50; H04B 10/66; H04L 67/12; B64F 5/40; B64D 5/00; B64D 2045/0085; B64D 2045/009; G07C 5/0808; G01L 1/24; G01L 1/245
USPC ........................................................ 398/116
See application file for complete search history.

(56) References Cited

U.S. PATENT DOCUMENTS

| | | | | |
|---|---|---|---|---|
| 5,913,245 A | * | 6/1999 | Grossman | ............... G01L 1/245 250/227.14 |
| 6,567,603 B1 | * | 5/2003 | Sukegawa | ............ G02B 6/3807 385/137 |
| 6,937,808 B2 | * | 8/2005 | Kawase | ............... G02B 6/3608 385/137 |
| 8,938,336 B2 | * | 1/2015 | Lee | ..................... B60R 21/0136 701/45 |
| 8,964,172 B1 | | 2/2015 | Breiholz et al. | |

(Continued)

OTHER PUBLICATIONS

European Patent Office Extended Search Report, dated May 29, 2020, regarding Application No. EP19209673.3, 8 pages.

*Primary Examiner* — Abbas H Alagheband
(74) *Attorney, Agent, or Firm* — Yee & Associates, P.C.

(57) ABSTRACT

A method, apparatus, and system for monitoring a vehicle. Optical signals are sent into a fiber optic mesh covering a region of the vehicle. Response optical signals occurring in response to optical signals sent into the fiber optic mesh are detected. Sensor data is generated from the response optical signals detected. A determination is made as to whether a group of nonconformances is present in the vehicle using the sensor data. A group of actions is performed when the group of nonconformances is present.

38 Claims, 11 Drawing Sheets

(56) References Cited

U.S. PATENT DOCUMENTS

| | | | |
|---|---|---|---|
| 9,655,526 B2* | 5/2017 | Hu | A61B 5/0205 |
| 2004/0155858 A1* | 8/2004 | Hiraoka | G02F 1/167 |
| | | | 345/107 |
| 2014/0220839 A1* | 8/2014 | Pribanic | B32B 5/24 |
| | | | 442/1 |
| 2014/0231637 A1* | 8/2014 | Blemel | G01D 5/35345 |
| | | | 250/227.14 |
| 2015/0266436 A1* | 9/2015 | Erb | B64D 45/00 |
| | | | 340/870.28 |
| 2016/0077027 A1* | 3/2016 | Sweers | B29C 65/8276 |
| | | | 324/654 |
| 2016/0089031 A1* | 3/2016 | Hu | A61B 5/6892 |
| | | | 600/480 |
| 2016/0096353 A1* | 4/2016 | Ferguson | B29C 66/5326 |
| | | | 442/1 |
| 2016/0187181 A1* | 6/2016 | Gupta | G01G 3/125 |
| | | | 177/177 |
| 2016/0337035 A1* | 11/2016 | Erb | B64F 1/14 |
| 2017/0215736 A1* | 8/2017 | Hu | A61B 5/725 |
| 2017/0283086 A1* | 10/2017 | Garing | B64D 45/0005 |
| 2017/0328741 A1 | 11/2017 | Okoli et al. | |
| 2017/0336268 A1* | 11/2017 | Wilson | G01L 1/246 |
| 2018/0164526 A1* | 6/2018 | Geiger | G01M 5/0033 |
| 2019/0277669 A1* | 9/2019 | Miller | G01D 5/35303 |
| 2019/0277708 A1* | 9/2019 | Miller | G01D 18/00 |
| 2019/0277709 A1* | 9/2019 | Miller | G01K 3/005 |

\* cited by examiner

EMBEDDED FIBER OPTIC SENSOR SYSTEM

BACKGROUND INFORMATION

1. Field

The present disclosure relates generally to sensor systems for vehicles, and in particular, to fiber object sensor systems for monitoring vehicles.

2. Background

Predicting when maintenance is needed can be performed using flight data in flight logs from flights of the aircraft. These flight data include performance data (e.g., fuel use), temperature, engine speed, cabin pressure, altitude, and other information about the flight of an aircraft. This information can be analyzed to predict when maintenance is needed. However, the data currently collected may not be as useful as desired in certain situations, such as for example, to reduce aircraft on ground situations.

It would be desirable to have a method and apparatus that take into account at least some of the issues discussed above, as well as other possible issues. For example, it would be desirable to have a method and apparatus that overcome a technical problem with determining when to perform maintenance on an aircraft.

SUMMARY

An embodiment of the present disclosure provides an aircraft monitoring system that comprises a fiber-optic mesh, an optical transmitter system, an optical receiver system, and a computer system. The fiber optic mesh covers a region of an aircraft. The optical transmitter system is connected to the fiber optic mesh. The optical transmitter system operates to send optical signals into the fiber optic mesh. The optical receiver system is connected to the fiber optic mesh. The optical receiver system operates to detect response optical signals occurring in response to the optical signals sent into the fiber optic mesh by the optical transmitter system and generates sensor data from the response optical signals detected. The computer system is in communication with the optical transmitter system and the optical receiver system. The computer system controls the optical transmitter system to send the optical signals into the fiber optic mesh, and receives sensor data from the optical receiver system during operation of the aircraft.

Another embodiment of the present disclosure provides a vehicle monitoring system that comprises a fiber optic mesh, an optical transmitter system, an optical receiver system, and a mesh controller. The fiber optic mesh covers a region of a vehicle. The optical transmitter system is connected to the fiber optic mesh. The optical transmitter system operates to send optical signals into the fiber optic mesh. The optical receiver system is connected to the fiber optic mesh. The optical receiver system operates to detect response optical signals occurring in response to the optical signals sent into the fiber optic mesh by the optical transmitter system and generates sensor data from the response optical signals detected. The mesh controller is in communication with the optical transmitter system and the optical receiver system. The monitor controls the optical transmitter system to send the optical signals into the fiber optic mesh, and receives sensor data from the optical receiver system. The mesh controller determines whether a group of nonconformances is present for the vehicle using the sensor data and performs a number of actions when the group of nonconformances is present.

Yet another embodiment of the present disclosure provides a monitoring system that comprises a computer system and a vehicle manager. The vehicle manager is located in the computer system. The vehicle manager operates to receive sets of sensor data from vehicles in which the vehicles generate the sets of sensor data from response optical signals detected in optical sensor meshes on the vehicles. The vehicle manager determines whether a group of nonconformances is present in the vehicles, and performs a number of actions when the group of nonconformances is present.

In still another embodiment of the present disclosure a method is provided for monitoring a vehicle. Optical signals are sent into a fiber optic mesh covering a region of the vehicle. Response optical signals occurring in response to optical signals sent into the fiber optic mesh are detected. Sensor data is generated from the response optical signals detected. A determination is made, by a computer system, as to whether a group of nonconformances is present in the vehicle using the sensor data. A group of actions is performed when the group of nonconformances is present.

In still another embodiment of the present disclosure a method is provided for monitoring a vehicle. Sensor data generated from response optical signals detected in an optical mesh covering a region of the vehicle during operation of the vehicle is received by a computer system. A determination is made by the computer system as to whether a group of nonconformances is present in the vehicle using the sensor data generated from the response optical signals detected. A group of actions is performed when the group of nonconformances is present.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the data provided by currently used sensor systems in aircraft may not be as sufficient as desired. For example, the data currently obtained may not enable performing maintenance in a manner that reduces aircraft on ground (AOG) situations as much. For example, the illustrative embodiments recognize and take into account that it would be desirable to detect events that can cause nonconformances. The illustrative embodiments recognize and take in account that it would be desirable to detect events such as an impact, a vibration, a strain, a stress, a temperature, a turbulence, or other events that can cause undesired amounts of wear or nonconformances on an aircraft.

Thus, the illustrative embodiments provide a method, an apparatus, and a system for monitoring a vehicle such as an aircraft. In one illustrative example, a vehicle monitoring system comprises a fiber-optic mesh, an optical transistor system, an optical receiver system, and a monitor. The fiber optic mesh covers a region of a vehicle. The optical transmitter system is connected to the fiber optic mesh, wherein the optical transmitter system operates to send optical signals into the fiber optic mesh. The optical receiver system is connected to fiber optic mesh and operates to detect response optical signals occurring in response to the optical signals sent into the fiber optic mesh by the optical transmitter and generates sensor data from the response optical signals detected. The monitor is in communication with the optical transmitter system and the optical receiver system. The monitor controls the optical transmitter to send the optical signals into the fiber optic mesh. The monitor receives sensor data from the optical receiver system during operation of the aircraft and determines whether a group of nonconformances is present for the aircraft using the sensor data. The monitor performs a number of actions when the group of nonconformances is present.

Figure 1:
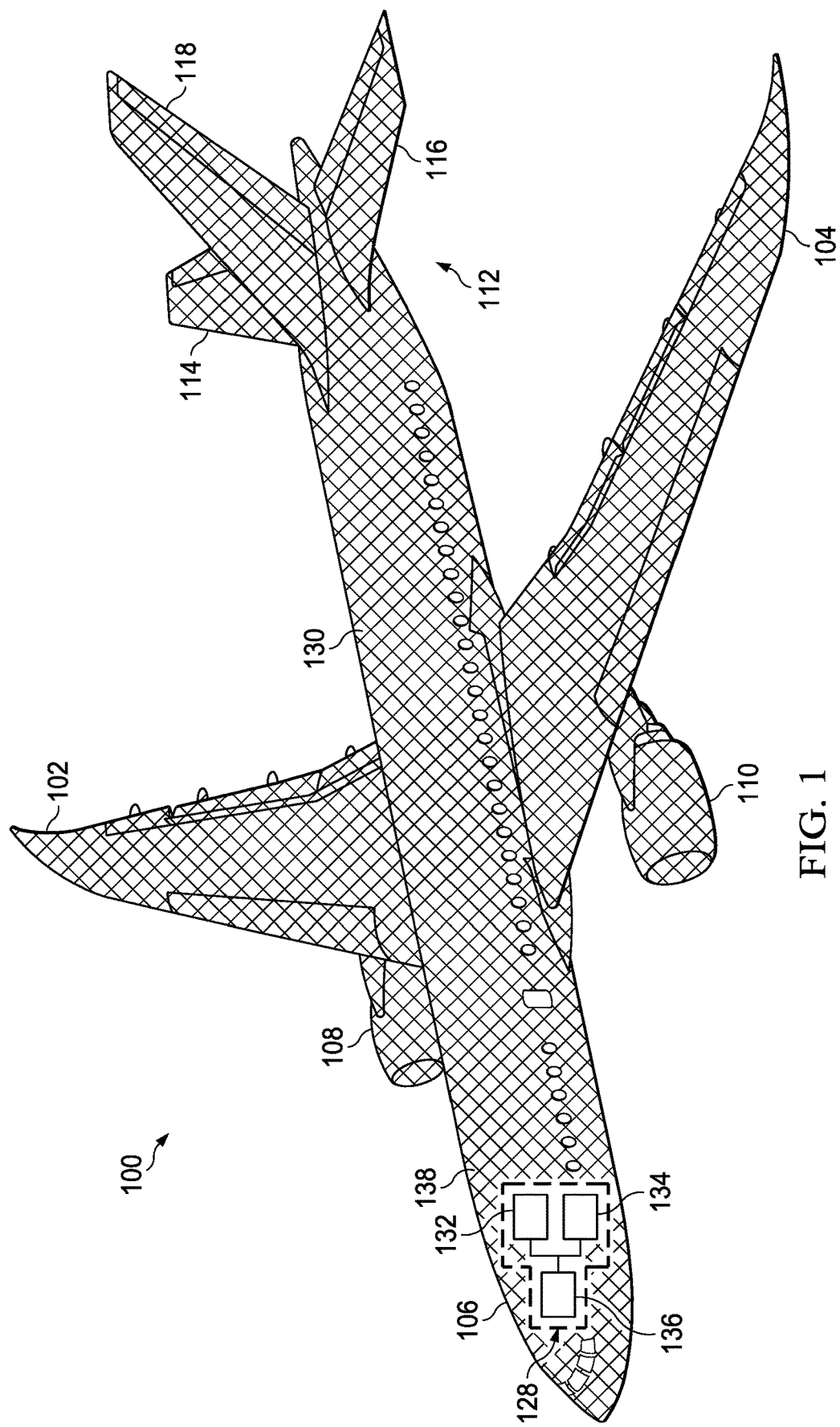
FIG. 1 is a pictorial illustration of an aircraft in accordance with an illustrative embodiment.

With reference now to the figures and, in particular, with reference to FIG. 1, a pictorial illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which aircraft monitoring system 128 can be implemented in accordance with an illustrative embodiment. As depicted, aircraft monitoring system 128 for aircraft 100 includes fiber optic mesh 130, optical transmitter system 132, optical receiver system 134, and computer system 136. In this illustrative example, optical transmitter system 132 and optical receiver system 134 are connected to fiber optic mesh 130. These connections are optical connections that enable optical transmitter system 132 to transmit optical signals to and through fiber optic mesh 130 and enable optical receiver system 134 to receive response optical signals that occur in response to the optical signals being transmitted through fiber optic mesh 130.

As depicted, fiber optic mesh 130 covers surface 138 of aircraft 100 except the windows. Fiber optic mesh 130 can be a film with optical fibers located on the film or embedded within the film. The film can be installed on surface 138 of aircraft 100.

Computer system 136 controls the operation of optical transmitter system 132 and optical receiver system 134. For example, computer system 136 can control optical transmitter system 132 to send optical signals into fiber optic mesh 130. Optical receiver system 134 can detect response optical signals that occur in response to the optical signals sent into fiber optic mesh 130.

In this illustrative example, computer system 136 can receive sensor data from optical receiver system 134. This sensor data can be used to determine whether a part or structure in aircraft 100 may need maintenance, replacement, inspection, or other suitable actions.

For example, computer system 136 can analyze the sensor data to determine whether a nonconformance is present in aircraft 100. This nonconformance can take a number of different forms. In this example, the nonconformance can be an a structural nonconformance. Structural nonconformances can be selected from at least one of a crack, a delamination, a structural flaw, wear, a dent, an electrical short, or some other structural feature that is not normal for aircraft 100.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The nonconformance can also be an environmental nonconformance. In this illustrative example, an environmental nonconformance can lead to structural nonconformances. Environmental nonconformances is an environmental parameter that is out of tolerance. Environmental nonconformances can be selected from at least one of a vibration, a strain, a stress, a temperature, a humidity level, or other environmental nonconformances.

When a nonconformance is detected, computer system 136 can perform a number of actions. As used herein, a "number of" when used with reference to items means one or more items. For example, a number of actions is one or more actions.

The number of actions can include at least one of scheduling maintenance for the aircraft 100, sending a message to a ground station, sending the message to an airline, sending the message to a maintenance facility, generating an entry in an aircraft data log, generating an alert, or some other suitable action.

The illustration of the aircraft monitoring system 128 is not meant to limit the manner in which other illustrative examples can be implemented. For example, fiber optic mesh 130 is shown to cover all of the surface 138 of aircraft 100 in which surface 138 is the exterior surface of aircraft 100. In this example, fiber optic mesh 130 is shown to cover all of the surface 138 of aircraft 100 in which surface 138 is the exterior surface of aircraft 100 except windows in aircraft 100. In other illustrative examples, fiber optic mesh 130 can also cover the interior surface of aircraft 100 in addition to, or in place of the exterior surface.

In yet another illustrative example, fiber optic mesh 130 can cover different portions of surface 138 of aircraft 100. For example, fiber optic mesh 130 can cover at least one of wing 102, wing 104, body 106, engine 108, engine 110, tail section 112, horizontal stabilizer 114, horizontal stabilizer 116, vertical stabilizer 118, a door, a flap, a slat, or some other part of aircraft 100.

Figure 2:
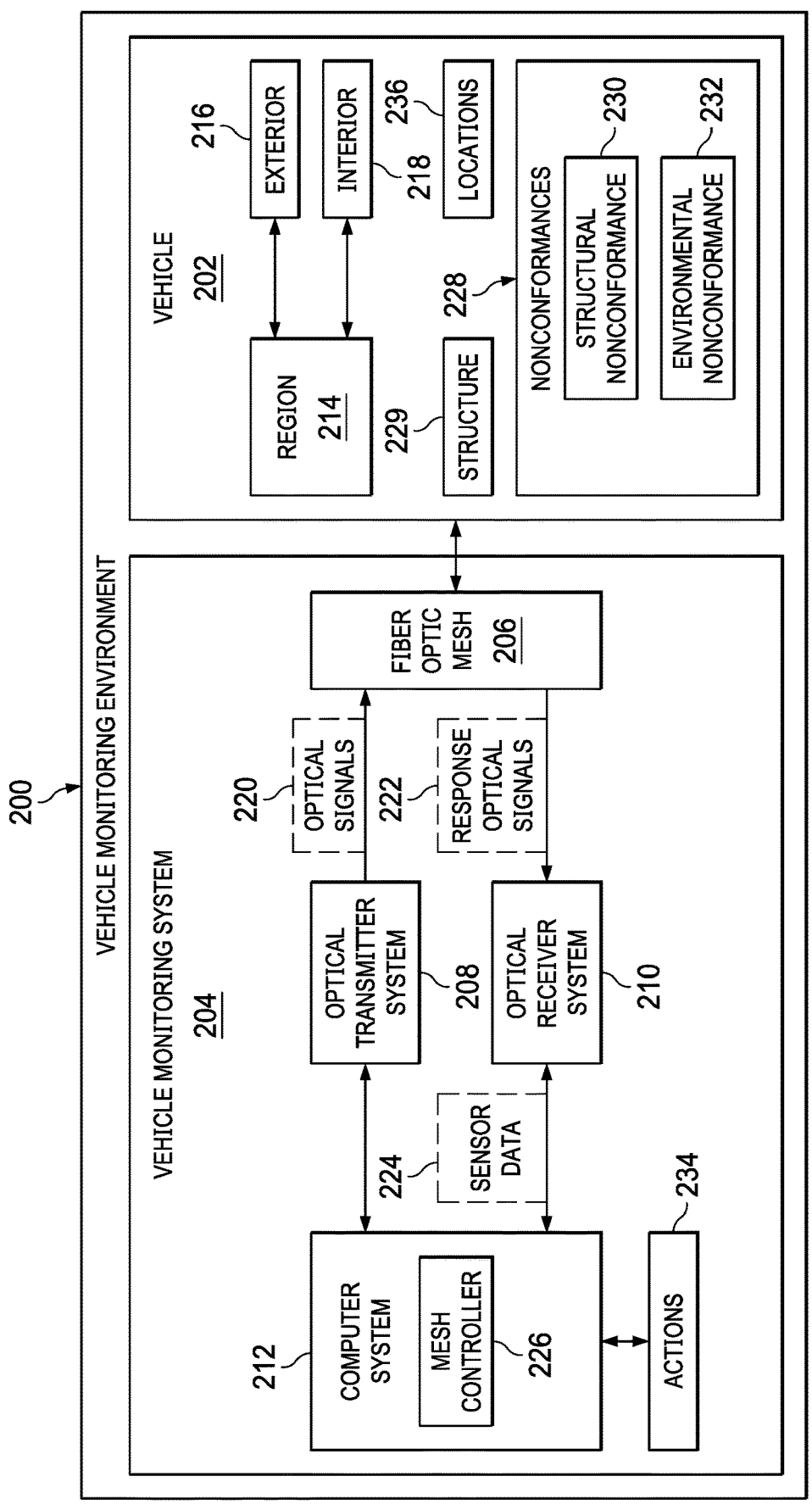
FIG. 2 is an illustration of a block diagram of a vehicle monitoring environment in accordance with an illustrative embodiment.

With reference now to FIG. 2, an illustration of a block diagram of a vehicle monitoring environment is depicted in accordance with an illustrative embodiment. In this illustrative example, vehicle monitoring environment 200 includes components that can be implemented in hardware such as the hardware shown for aircraft 100 in FIG. 1.

As depicted, vehicle monitoring environment 200 includes vehicle 202 that can be monitored using vehicle monitoring system 204. In this depicted example, vehicle 202 can be selected from a group comprising a mobile platform, an aircraft, a surface ship, a tank, a personnel carrier, train, a spacecraft, a submarine, a bus, an automobile, or some other suitable vehicle.

In this illustrative example, vehicle monitoring system 204 includes a number of different components. As depicted, vehicle monitoring system 204 comprises fiber optic mesh 206, optical transmitter system 208, optical receiver system 210, and computer system 212.

In this figure, fiber optic mesh 206 covers region 214 of vehicle 202. Region 214 can be part or all of vehicle 202. In this illustrative example, region 214 is located on exterior 216 of vehicle 202. In other illustrative examples, region 214 can be located in interior 218 of vehicle 202 in addition to or in place of exterior 216 of vehicle 202. Region 214 can be selected from at least one of a body, a door, a wing, a fuselage, a vertical stabilizer, a horizontal stabilizer, a cargo area, a control surface, an entire surface of the vehicle, or some other part of vehicle 202.

In this depicted example, optical transmitter system 208 is connected to fiber optic mesh 206. This connection is an optical connection. Optical transmitter system 208 can be comprised of one or more optical transmitters. An optical transmitter can be, for example, a semiconductor device such as light-emitting diodes (LED) or laser diodes. Optical transmitter system 208 operates to send optical signals 220 into fiber optic mesh 206.

As depicted, optical receiver system 210 is connected to fiber optic mesh 206. This connection is also an optical connection. Optical receiver system 210 can be one or more optical receivers. An optical receiver can be a photodetector that converts light into electricity using the photoelectric effect. Optical receiver system 210 operates to detect response optical signals 222 occurring in response to optical signals 220 being sent into fiber optic mesh 206 by optical transmitter system 208.

In other words, response optical signals 222 occur in response to optical signals 220 being sent into fiber optic mesh 206. The light in optical signals 220 have parameters that can change when at least one of strain, temperature, pressure, or other changes occur in fiber optic mesh 206. These changes can modify parameters in the light in optical signals 220 resulting in response optical signals 222. These parameters include at least one of intensity, phase, polarization, wavelength, transit time of light in the fiber optic mesh, or other suitable parameters.

In this illustrative example, these parameters are detected by optical receiver 210. Optical receiver 210 compares these detected parameters with the parameters of optical signals 220 as sent by optical transmitter 208. The changes or lack of changes are used to generate sensor data 224.

Optical receiver system 210 also operates to generate sensor data 224 from response optical signals 222 detected by optical receiver system 210. For example, optical receiver system 210 can include a processor unit, a circuit, or other hardware that generates data. For example, the processor unit, the circuit, or other hardware can generate messages for transmission on a network data processing system that follow a protocol, such as an Internet protocol suite that includes transmission control protocol (TCP)/Internet protocol (IP). In this example, sensor data 224 can comprise at least one of a strain, a temperature, a vibration, a pressure, a sound, or some other type of sensor data.

In this illustrative example, computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted in this figure, mesh controller 226 is located in computer system 212. Mesh controller 226 is in communication with optical transmitter system 208 and optical receiver system 210.

Mesh controller 226 operates to control optical transmitter system 208 to send optical signals 220 into fiber optic mesh 206. Further, mesh controller 226 operates to receive sensor data 224 from optical receiver system 210. In this illustrative example, sensor data 224 can be received during operation of vehicle 202 or when vehicle 202 is idle, parked, at a gate, waiting to move, or some other operation of vehicle 202.

Mesh controller 226 determines whether a group of nonconformances 228 is present for vehicle 202 using sensor data 224. As used herein, a "group of" when used with reference to items means one or more items. For example, the group of nonconformances 228 is one or more of nonconformances 228. For example, mesh controller 226 can determine whether the group of environmental nonconformance 232 is present in structure 229 in vehicle 202 using sensor data 224. For example, when vehicle 202 is an aircraft, structure 229 can be selected from a group comprising a flap, a skin panel, a joint, a monument, a window, a control surface, a fuselage section, and other suitable types of structures.

In this illustrative example, the group of nonconformances can be at least one of structural nonconformance 230 or environmental nonconformance 232. Structural nonconformance 230 can be selected from a group comprising a crack, a delamination, a structural flaw, wear, a dent, an exposed electrical wire, or some other structural feature that is not normal or out of tolerance for vehicle 202.

Environmental nonconformance 232 can lead to structural nonconformance 230 immediately or over time. In this illustrative example, environmental nonconformance 232 is a parameter that is out of tolerance. Environmental nonconformance 232 can be selected from a group comprising a vibration, a strain, a stress, a temperature, a humidity level, an electrical current, or other parameter that is undesired. For example, turbulence can result in sensor data 224 including at least one of a vibration, a strain, a stress, or other parameter that is abnormal because of the turbulence. An electromagnetic event, such as lighting, can also result in sensor data 224 including at least one of a current, a vibration, heat caused by the electromagnetic event, or some other parameter that is abnormal because of the electromagnetic event.

In determining whether the group of nonconformances 228 is present in vehicle 202 using sensor data 224, mesh controller 226 in computer system 212 can determine whether the group of nonconformances 228 is present at a group of locations 236 using sensor data 224.

As depicted, mesh controller 226 performs a number of actions 234 when group of nonconformances 228 is present. In performing the number of actions 234, mesh controller 226 can schedule maintenance for vehicle 202 when the group of nonconformances 228 is present in vehicle 202.

Mesh controller 226 can be implemented in software, hardware, firmware or a combination thereof. When software is used, the operations performed by mesh controller 226 can be implemented in program code configured to run on hardware, such as a processor unit. When firmware is used, the operations performed by mesh controller 226 can be implemented in program code and data and stored in persistent memory to run on a processor unit. When hardware is employed, the hardware can include circuits that operate to perform the operations in mesh controller 226.

In the illustrative examples, the hardware can take a form selected from at least one of a circuit system, an integrated circuit, an application specific integrated circuit (ASIC), a programmable logic device, or some other suitable type of hardware configured to perform number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Figure 3:
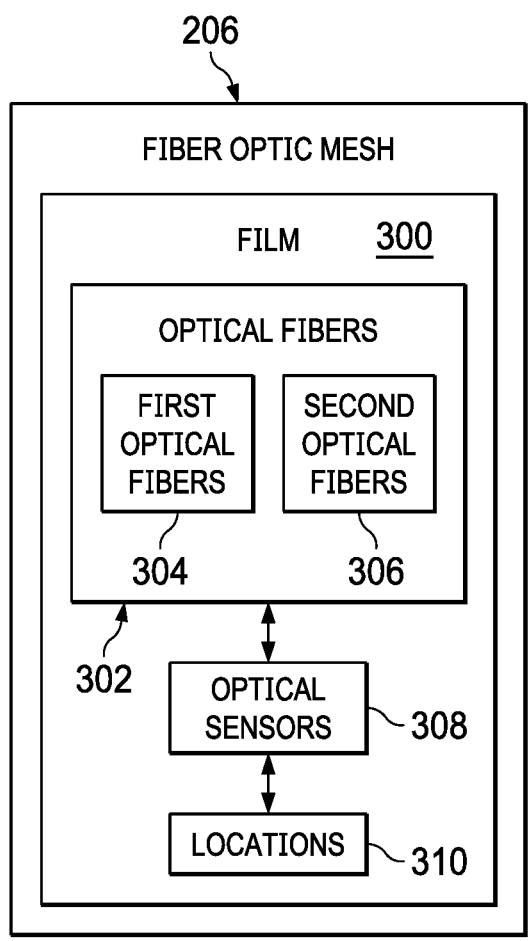
FIG. 3 is an illustration of a block diagram of an optical sensor mesh in accordance with an illustrative embodiment.

With reference to FIG. 3, an illustration of a block diagram of an optical sensor mesh is depicted in accordance with an illustrative embodiment. In the illustrative examples, the same reference numeral may be used in more than one figure. This reuse of a reference numeral in different figures represents the same element in the different figures. FIG. 3 depicts an example of components that can be used to implement fiber optic mesh 206 in FIG. 2.

In this illustrative example, fiber optic mesh 206 comprises film 300 and optical fibers 302. Film 300 can take a number of different forms. As depicted, optical fibers 302 are associated with film 300. Optical fibers 302 can be associated with film 300 in a number of different ways. For example, optical fibers 302 can be associated with film 300 by being attached or adhered to one side of film 300. In another example, optical fibers 302 can be associated with film 300 by being embedded or integrated within film 300.

For example, film 300 can be comprised of at least one of an adhesive film, a tape, prepreg, a polymer film, a synthetic polymer film, or some other type of film. In one illustrative example, film 300 can be a prepreg in which optical fibers 302 are laid on the prepreg or embedded within the prepreg. This prepreg can be placed on the surface of vehicle 202 and cured. In this particular example, film 300 becomes a composite layer including optical fibers 302 for vehicle 202.

In this illustrative example, optical fibers 302 can include first optical fibers 304 and second optical fibers 306. First optical fibers 304 are generally parallel to each other, and second optical fibers 306 are generally parallel to each other. In this example, first optical fibers 304 intersect second optical fibers 306. In other words, first optical fibers 304 lie across or over second optical fibers 306.

In this illustrative example, parameters for the light in the optical signals can change in response to changes in at least one of strain, temperature, pressure, or other quantities. These changes can modify response parameters for the light in the optical signals. These parameters include at least one of intensity, phase, polarization, wavelength, transit time of light in the fiber optic mesh, or other suitable parameters.

For example, optical fibers 302 can be the same type or different types depending on the particular implementation. For example, optical fibers 302 can include optical fibers that have evanescent loss that varies with temperature. Alternatively, at least one of the Rayleigh Scattering, Raman scattering, or Brillouin scattering can be analyzed for the lights in the optical fiber to determine temperature.

As another example, optical fibers 302 can include optical fibers that include fiber Bragg gratings. These types of grates can increase the accuracy in detecting temperature and strain.

As another example, optical fibers 302 in fiber optic mesh 206 can be used to detect vibrations including sound. Further, changes in the surface of a vehicle also can change the values for the parameters of the optical signals. For example, a smooth surface can provide one set of values for the parameters, while a dent in the surface will provide a different set of values for the parameters. In this manner, the occurrence of nonconformances such as dents, warping, deformations, or other changes in the surface of the vehicle can be detected.

In another illustrative example, fiber optic mesh 206 can also include a group of optical sensors 308. The group of optical sensors 308 are connected to optical fibers 302. A group of locations 310 of the group of optical sensors 308 may be selected based on a number of different factors. For example, an icing sensor may be placed in a location where icing may occur on vehicle. An icing sensor can be an optical transducer probe. Other types of optical sensors include a temperature sensor, a pressure sensor, a vibration sensor, an acceleration sensor, or other suitable types of sensors.

In one illustrative example, one or more technical solutions are present that overcome a technical problem with scheduling maintenance in a manner that reduces unexpected availability of aircraft such as aircraft on ground (AOG) situations. As a result, one or more technical solutions can provide a technical effect of detecting nonconformances that currently used techniques are unable to effectively identify.

One or more technical solutions employ a vehicle monitoring system that includes a fiber optic mesh covering a region of the vehicle. This fiber optic mesh enables detecting nonconformances that occur for that vehicle. The sensor data can be generated in real time during operation of the vehicle and used to more effectively determine when nonconformances are present. When the detection of nonconformances occur, actions such as maintenance can be scheduled in a manner that reduces unexpected unavailability of the vehicle.

In one or more technical solutions, fiber optic mesh 206 is a sensor layer that can actively listen throughout the entire structure of vehicle 202. Fiber optic mesh 206 can be used as a nervous system for vehicle 202 that can pinpoint any anomalous strikes, sounds, or vibrations of individual components throughout the entire embedded structure.

Computer system 212 can be configured to perform at least one of the steps, operations, or actions described in the different illustrative examples using software, hardware, firmware or a combination thereof. As a result, computer system 212 operates as a special purpose computer system in which mesh controller 226 in computer system 212 enables detecting nonconformances in a vehicle. In particular, mesh controller 226 transforms computer system 212 into a special purpose computer system as compared to currently available general computer systems that do not have mesh controller 226.

The illustration of vehicle monitoring environment 200 in FIG. 2 and FIG. 3 is not meant to imply physical or architectural limitations to the manner in which an illustrative embodiment may be implemented. Other components in addition to or in place of the ones in illustrated may be used. Some components may be unnecessary. Also, the blocks are presented to illustrate some functional components. One or more of these blocks may be combined, divided, or combined and divided into different blocks when implemented in an illustrative embodiment.

For example, one or more fiber optic meshes can be used in addition to or in place of fiber optic mesh 206 on vehicle 202. As another example, fiber optic mesh 206 can include multiple layers. For example, film 300 can have multiple layers. Alternatively, multiple films can be layered with optical fibers 302 to form fiber optic mesh 206.

In another example, mesh controller 226 can be located in a remote location to vehicle 202. In this example, mesh controller 226 can be in communication with fiber optic mesh 206 on vehicle 202 using a wireless communications link. In other words, processing and analysis of sensor data 224 can be performed in remote location with respect to vehicle 202.

In another example, mesh controller 226 can be located remote from vehicle 202. In this example, sensor data 224 can be recorded by computer system 212 and sent to mesh controller 226 for post-processing to perform the analysis. Alternatively, sensor data 224 can be streamed over a wireless connection to mesh controller 226 in the remote location.

Figure 4:
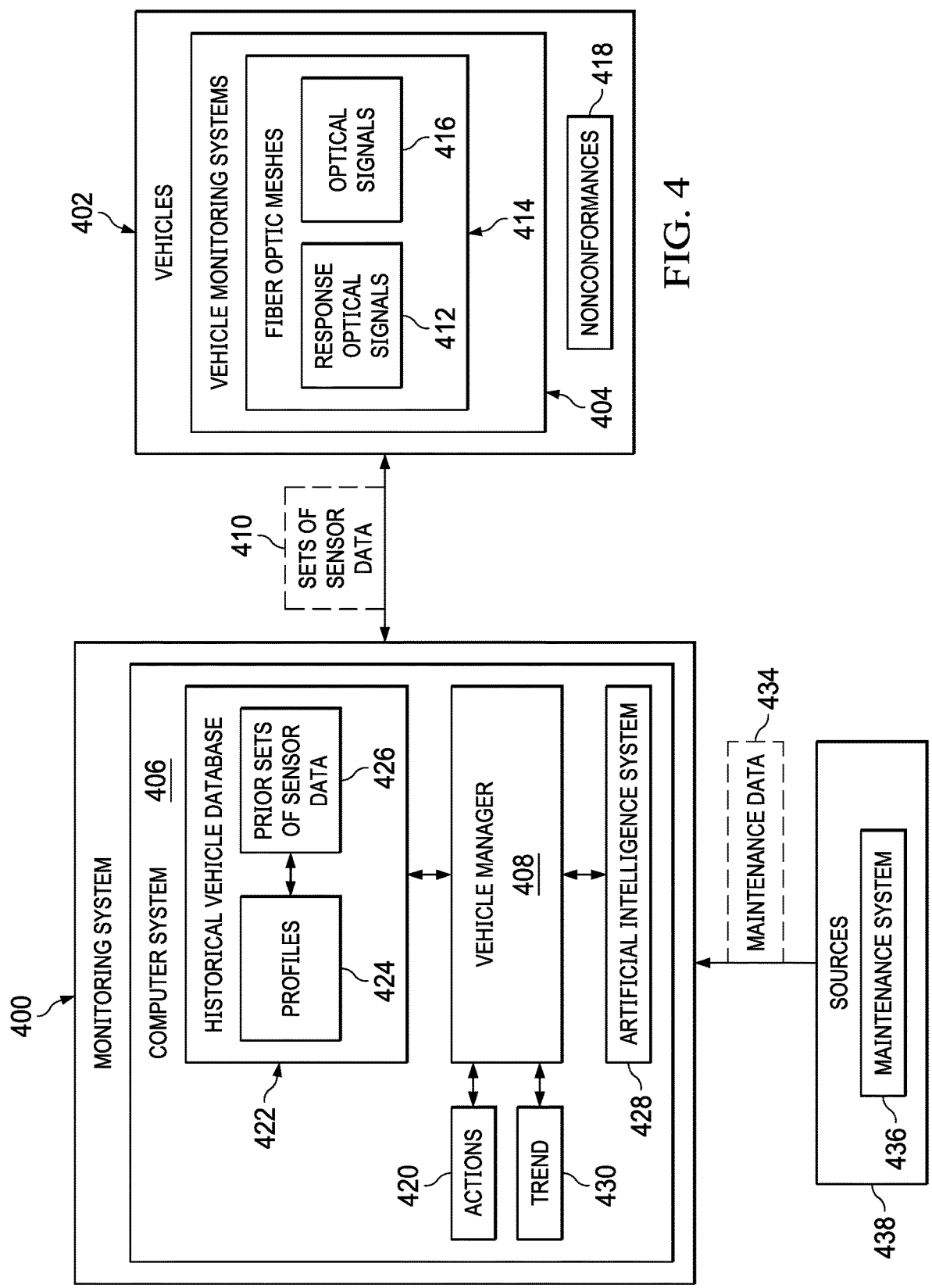
FIG. 4 is an illustration of a block diagram of a monitoring system in accordance with an illustrative embodiment.

With reference now to FIG. 4, an illustration of a block diagram of a monitoring system is depicted in accordance with an illustrative embodiment. In this illustrative example, monitoring system 400 can be used to monitor vehicles 402.

In this illustrative example, vehicles 402 can be part of a fleet of vehicles for an organization such as a transportation carrier.

As depicted, vehicles 402 can be all the same type or different types of vehicles. For example, vehicles 402 can include at least one of an aircraft, a train, a bus, a ship, or some other suitable type of vehicle.

In this illustrative example, vehicles 402 have vehicle monitoring systems 404. In other words, each vehicle in vehicles 402 has a vehicle monitoring system in vehicle monitoring systems 404. Vehicle monitoring system 204 in FIG. 2 can be used to implement vehicle monitoring systems 404.

In this illustrative example, monitoring system 400 includes a number of different components. As depicted, monitoring system 400 includes computer system 406 and vehicle manager 408.

Computer system 406 is a physical hardware system and includes one or more data processing systems. When more than one data processing system is present in computer system 406, those data processing systems are in communication with each other using a communications medium. The communications medium can be a network. The data processing systems can be selected from at least one of a computer, a server computer, a tablet computer, or some other suitable data processing system.

As depicted, vehicle manager 408 is located in computer system 406. Vehicle manager 408 can be implemented using at least one of software or hardware. Vehicle manager 408 can take a form similar to mesh controller 226 in FIG. 2.

In this illustrative example, vehicle manager 408 operates to receive sets of sensor data for 410 from vehicles 402. As used herein, a set when used with reference to items means one or more items. For example, a set of sensor data is one or more pieces of sensor data.

In this illustrative example, vehicles 402 generate the sets of sensor data 410 from response optical signals 412 detected in fiber optic meshes 414 in vehicle monitoring systems 404 in which fiber optic meshes 414 are located on vehicles 402. Response optical signals 412 are generated in response to sending optical signals 416 into fiber optic meshes 414.

Sets of sensor data 410 can be sent from vehicles 402 to computer system 406 over various types of connections between vehicles 402 and computer system 406. These connections can include at least one of a tethered connection or a wireless connection. A tethered connection can be a wire, an optical fiber, or some other physical link. This type connection can be established when a vehicle is in a location where this type of connection is available. Wireless connections can be used to send the sets of sensor data 410 more frequently or in real time depending on the particular implementation.

In this illustrative example, vehicle manager 408 determines whether a group of nonconformances 418 is present in vehicles 402. If a group of nonconformances 418 is present, those nonconformances can be present in one or more of vehicles 402. In other words, nonconformances 418 may not be present in all of vehicles 402.

Vehicle manager 408 performs a number of actions 420 when the group of nonconformances 418 is present. These actions can take a number of different forms. For example, vehicle manager 408 can schedule maintenance, generate a log entry, send a message, generate an alert, or perform other suitable actions.

In this illustrative example, monitoring system 400 includes historical vehicle database 422. Profiles 424 for the vehicles are stored in historical vehicle database 422. Profiles 424 are created from prior sets of sensor data 426 generated from prior response optical signals detected in the fiber optic meshes 414 on the vehicles 402. These prior sets of sensor data are historical data stored for vehicles 402.

Further, vehicle manager 408 can analyze the sets of sensor data 410 and prior sets of sensor data 426 to determine trend 430 for the group of nonconformances 418 for vehicles 402 as part of determining whether the group of nonconformances 418 is present. In this illustrative example, trend 430 can indicate whether certain types of nonconformances 418 are common between vehicles 402.

This trend can include a determination of whether different types of nonconformances 418 occur based on the amount of use, age, location, or other factors with respect to vehicles 402. For example, vehicles 402 that are used in particular locations may be subject to more nonconformances 418 of a particular type due to weather or environmental conditions at those locations. As another example, when vehicles 402 are in the form of commercial aircraft, trend 430 can indicate whether particular types of maintenance are needed based on at least one of the amount of turbulence or severity turbulence encountered by the aircraft.

In this illustrative example, vehicle manager 408 can also determine whether a group of nonconformances 418 is present for vehicles 402 using sets of sensor data 410 and prior sets of sensor data 426 in historical vehicle database 422 in determining whether a group of nonconformances 418 is present.

When vehicles 402 are of a same type, vehicle manager 408 can use the sets of sensor data 410 and prior sets of sensor data 426 in historical vehicle database 422 in predicting a group of nonconformances 418 for vehicles 402. In this illustrative example, vehicle manager 408 can use artificial intelligence system 428 to perform analysis to perform at least one of identifying the group of nonconformances 418 or predicting an occurrence of the group of nonconformances 418.

Artificial intelligence system 428 is a system that has intelligent behavior and can be based on function of the human brain. An artificial intelligence system comprises at least one of an artificial neural network, a cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

Further, historical vehicle database 422 can also identify nonconformances 418 for vehicles 402. By recording previously identified nonconformances, this information can be used by at least one of vehicle manager 408 or artificial intelligence system 428 to aid in predicting the occurrence of potential nonconformances for a selected vehicle of interest in vehicles 402.

In predicting nonconformances 418, other sources 438 of data can also be used in the analysis. For example, sources 438 can include maintenance data 434 obtained from maintenance system 436.

Maintenance system 436 can be a maintenance scheduling and parts database used in scheduling and performing maintenance on vehicles 402. In this example, maintenance system 436 can be a system operated by a manufacturer or manufacturers of vehicles 402. In other illustrative examples, maintenance system 436 can be operated by third-party maintenance organization.

The illustration of monitoring system 400 in FIG. 4 is provided as one example of an implementation for monitoring system 400. This depicted example is not meant to limit the manner in which other illustrative examples can be implemented. For example, other types of data obtained from sources 438 can be used by vehicle manager 408, artificial intelligence system 428, or both in identifying nonconformances, predicting nonconformances or both.

For example, when vehicles 402 are aircraft, sources 438 can provide route information for prior flights, weather data, airport conditions, or other information can also be used in addition to or in place of maintenance data 434. Further, sensor data from other types of sensor systems in vehicles 402 can also be used in addition to sensor data 410 from fiber optic meshes 414 to identify or predict nonconformances 418.

Figure 5:
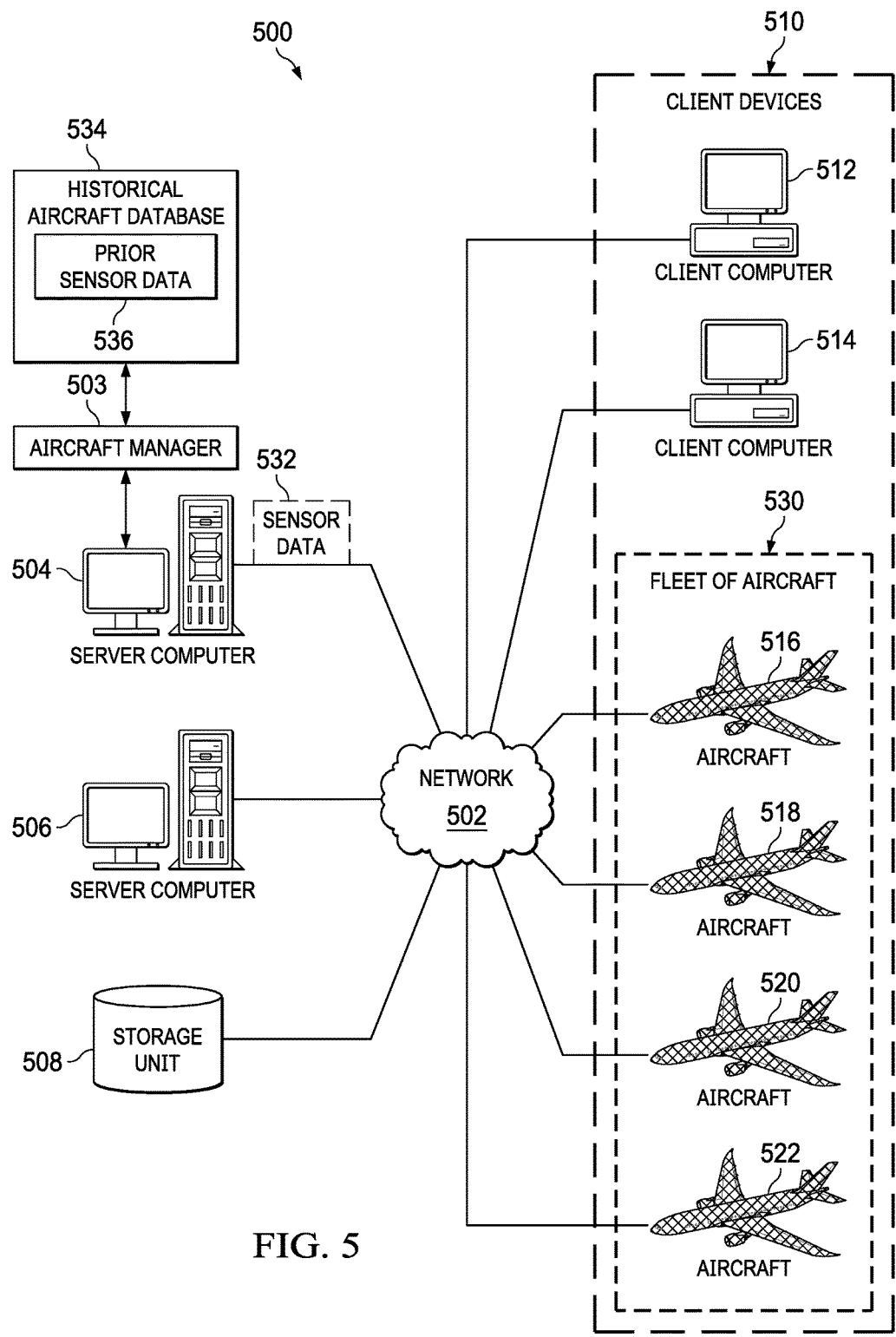
FIG. 5 is an illustration of a pictorial representation of an aircraft monitoring system in accordance with an illustrative embodiment.

With reference next to FIG. 5, an illustration of a pictorial representation of an aircraft monitoring system is depicted in accordance with an illustrative embodiment. Aircraft monitoring system 500 is a network of computers in which the illustrative embodiments may be implemented. For example, aircraft monitoring system 500 can be implemented using components in vehicle monitoring system 204 shown in block form in FIG. 2. Aircraft monitoring system 500 contains network 502, which is the medium used to provide communications links between various devices and computers connected together within aircraft monitoring system 500. Network 502 may include connections, such as wire, wireless communication links, or fiber optic cables.

In the depicted example, server computer 504 and server computer 506 connect to network 502 along with storage unit 508. In addition, client devices 510 connect to network 502. As depicted, client devices 510 include client computer 512 and client computer 514. Client devices 510 can be, for example, computers, workstations, or network computers. In the depicted example, server computer 504 provides information, such as boot files, operating system images, and applications to client devices 510. Further, client devices 510 can also include other types of client devices such as aircraft 516, aircraft 518, aircraft 520, and aircraft 522. In this illustrative example, these aircraft are considered client devices that are part of an Internet of things (IoT). These aircraft include computer systems that can connect to network 502.

In this illustrative example, server computer 504, server computer 506, storage unit 508, and client devices 510 are network devices that connect to network 502 in which network 502 is the communications media for these network devices. Some or all of client devices 510 may form an Internet of things (IoT) in which these physical devices can connect to network 502 and exchange information with each other over network 502.

Client devices 510 are clients to server computer 504 in this example. Aircraft monitoring system 500 may include additional server computers, client computers, and other devices not shown. Client devices 510 connect to network 502 utilizing at least one of wired, optical fiber, or wireless connections.

Program code located in aircraft monitoring system 500 can be stored on a computer-recordable storage medium and downloaded to a data processing system or other device for use. For example, program code can be stored on a computer-recordable storage medium on server computer 504 and downloaded to client devices 510 over network 502 for use on client devices 510.

In the depicted example, aircraft monitoring system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, aircraft monitoring system 500 also may be implemented using a number of different types of networks. For example, network 502 can be comprised of at least one of the Internet, an intranet, a local area network (LAN), a metropolitan area network (MAN), or a wide area network (WAN). FIG. 5 is intended as an example, and not as an architectural limitation for the different illustrative embodiments.

In this illustrative example, aircraft manager 503 is located in server computer 504 and is an example of an implementation for vehicle manager 408. In this illustrative example, aircraft manager 503 operates to monitor fleet of aircraft 530. As depicted, fleet of aircraft 530 includes aircraft 516, aircraft 518, aircraft 520, and aircraft 522.

As depicted, fleet of aircraft 530 include vehicle monitoring systems such as vehicle monitoring system 204 shown in block form in FIG. 2. During operation of fleet of aircraft 530, aircraft 516, aircraft 518, aircraft 520, and aircraft 522 sent sensor data 532 to aircraft manager 503 running on server computer 504. Sensor data 532 can be stored in historical aircraft database 534 along with prior sensor data 536 previously stored for fleet of aircraft 530.

With historical aircraft database 534, aircraft manager 503 can analyze sensor data 532 along with prior sensor data 536. This analysis can be performed to determine whether a trend is present with respect to the occurrence of nonconformances within fleet of aircraft 530.

In this illustrative example, the nonconformances can be at least one of structural or environmental nonconformances. Structural nonconformances can be analyzed to determine whether corresponding nonconformances occur within the different aircraft within fleet of aircraft 530. If a trend is identified with respect to a particular nonconformance, aircraft manager 503 can schedule maintenance in a manner that avoids undesired conditions such as an aircraft on ground condition.

Further, aircraft manager 503 can use environmental nonconformances to predict structural nonconformances. For example, the sensor data generated in response to detecting an occurrence of an environmental nonconformance can be used to predict whether particular structures in the aircraft will develop structural nonconformances. The environmental nonconformance can be for example undesired vibrations in the wing of an aircraft. This type of prediction can be used to schedule maintenance sooner as compared to if those undesired vibrations were absent. As another example, environmental nonconformances in the form of extreme temperatures can also be used to predict whether structural nonconformances may occur in different structures in the aircraft.

Thus, analyzing nonconformances over at least one of the aircraft, a fleet of aircraft, fleets of aircraft, locations, different environmental conditions, or other factors can provide first indicators of potential nonconformances. This type of analysis can also provide a better understanding of design parameters of the aircraft.

In this manner, undesired operating conditions such as an aircraft on ground can be reduced or avoided through the use of aircraft monitoring system 500. In this manner, undesired delays and increased costs from aircraft on ground situations can be reduced using the aircraft monitoring system 500.

The illustration of aircraft monitoring system 500 is only intended as an example of one implementation for monitoring system 400 in FIG. 4. The illustration of aircraft monitoring system 500 is not meant to limit the manner in which other monitoring systems can be implemented. For example, other aircraft monitoring systems can include other numbers of aircraft. For example, an aircraft monitoring system can be used to monitor 10 aircraft, 50 aircraft, 230 aircraft, or some other number of aircraft. Further, aircraft can be the same or different types of aircraft.

Figure 6:
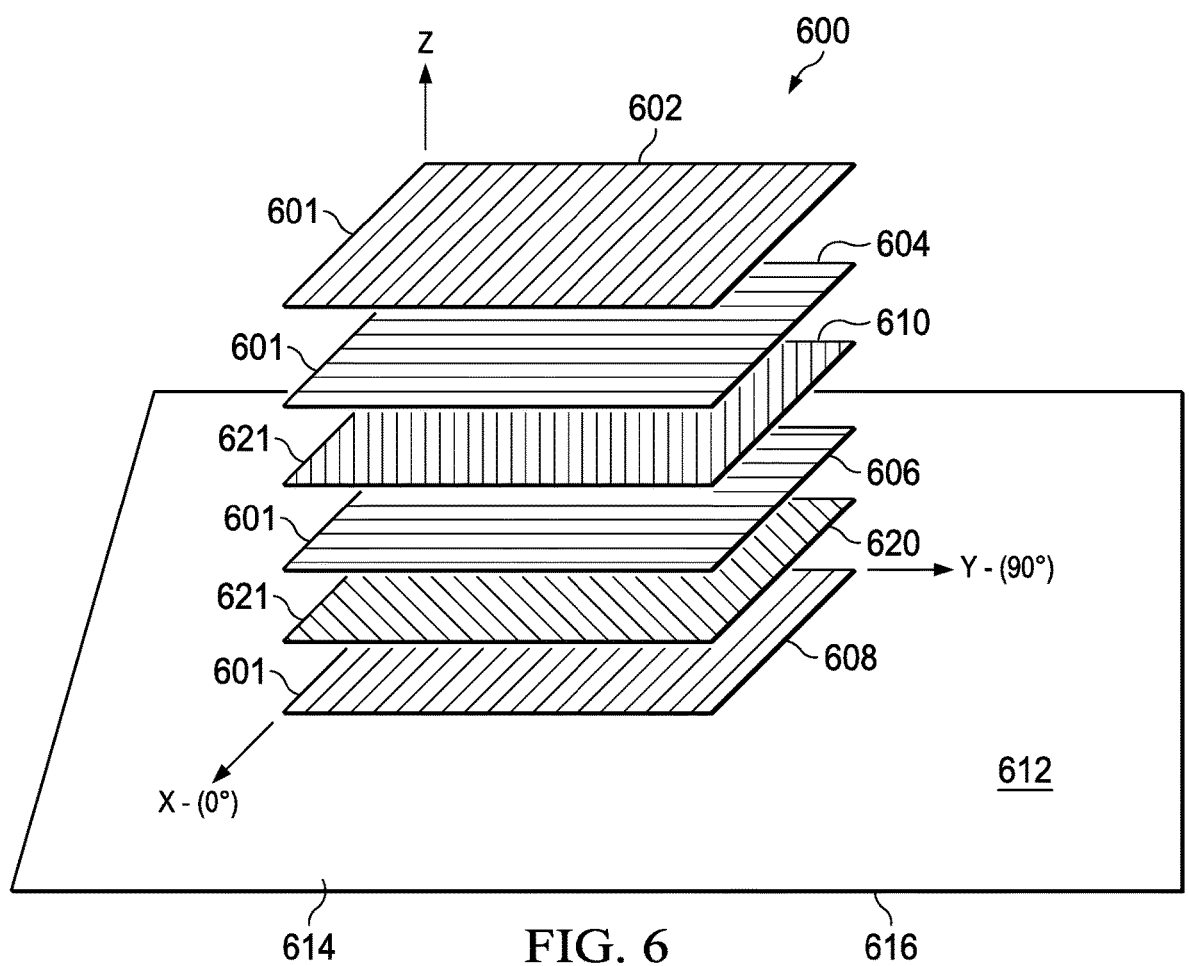
FIG. 6 is a pictorial illustration of an exploded view of a fiber optic mesh in accordance with an illustrative embodiment.

With reference next to FIG. 6, a pictorial illustration of an exploded view of a fiber optic mesh is depicted in accordance with an illustrative embodiment. In this illustrative example, fiber-optic mesh 600 is an example of one implementation for fiber-optic mesh 206 shown in block form in FIG. 2 and FIG. 3.

As depicted, fiber optic mesh 600 comprises structural layers 601 and optical layers 621. As depicted, structural layers 601 include layer 602, layer 604, layer 606, and layer 608. In the illustrative example, optical layers 621 include optical layer 610 and optical layer 620.

Structural layers 601 are layers that can be used with optical layers 621. Optical layers 621 can be interspersed between structural layers 601 or optical layers 621 can be a top or bottom layer.

Each optical fiber layer in optical fiber layers 621 can each be comprised of optical fibers such as optical fibers 302, which include first optical fibers 304 and second optical fibers 306 that overlap each other.

In this illustrative example, optical fibers in optical fiber layer 610 are located between layer 604 and layer 606. Optical layers 621 is located between layer 606 and layer 608. Optical fiber layer 610 and optical layers 621 can comprise optical fibers that are embedded in a sheet, a film, or some other type of material that is located between layer 604 and layer 606.

These different layers can be comprised of the same or different types of materials. The layers can be comprised of at least one of a film, a Kevlar sheet, a graphite sheet, a carbon fiber layer, or some other suitable type of layer. For example, layer 604, layer 606, and layer 608 can be Kevlar sheets selected as a protective layer. Layer 602 can be an ultraviolet film that protects fiber-optic mesh 600 from ultraviolet radiation.

These different layers can be associated with each other using at least one of an adhesive, glue, heat, heat and pressure, or other suitable bonding materials or techniques.

In this illustrative example, fiber optic mesh 600 is installed on surface 612 of structure 614 on vehicle 616. In this illustrative example, structure 614 can be selected from a group comprising a fuselage, a wing, a skin panel, an automobile, a door, a control surface, a flap, a rudder, a window, or some other suitable structure. In this depicted example, fiber optic mesh 600 can cover multiple structures on surface 612 of vehicle 616.

As depicted, layer 608 is the layer that contacts surface 612 of vehicle 616. In one illustrative example, fiber-optic mesh 600 can be similar to a wrap used to cover a car. In other illustrative examples, fiber optic mesh 600 can include composite components that are cured such that fiber optic mesh 600 becomes part of or integrated into surface 612 of structure 614 of vehicle 616.

With optical fiber layer 610 and optical fiber layer 620 in each can each be designed to detect different parameters. These different parameters can be detected based on the selection of at least one of the optical fibers. For example, a long-period fiber grating can be used to detect a direction of bending, a Fiber Bragg grating can be used to detect statistic pressure, mechanical tension, compression, and fiber temperature changes.

As another example, optical signals can be sent through one or more of the optical layers and the response optical signals from those optical fiber layers can be used to generate sensor data to detect different types of nonconformances. For example, the sensor data generated from response optical signals in optical fiber layer 610 can be used to detect environmental nonconformances while the sensor data generated from the response optical signals in optical fiber layer 620 can be used in detecting structural nonconformances.

For example, the response optical signals from optical fiber layer 610 can be analyzed to detect an environmental nonconformance such as temperatures that are present with icing conditions, while the response optical signals from optical fiber layer 620 can be processed to determine whether a structural nonconformance such as a dent is present.

The processing of sensor data generated from the detection of these response optical signals can be performed concurrently by mesh controller 226 running in computer system 212. For example, mesh controller 226 can be multithreaded and can process the sensor data generated from response optical signals detected in optical fiber layer 610 and optical fiber layer 620.

For example, response optical signals in optical fiber layer 620 can be used to generate sensor data that identifies a phase shift between the optical signals sent into optical fiber layer 620 and the response optical signals detected in optical fiber layer 620. This phase shift is caused by sound vibrations.

Further, optical fiber layer 610 can be employed to detect electromagnetic events such as a lightning strike. Optical fiber layer 610 can include optical fibers that are configured as closed fiber loops. With this configuration type of in at least some of the optical fibers in optical fiber layer 610, an electromagnetic event can be detected using the Faraday Effect. The Faraday Effect causes the polarization plane of the optical signals traveling through the optical fibers to rotate when the optical fibers are exposed to a magnetic field in the direction of light propagation.

In yet another illustrative example, at least one of optical fiber layer 610 or optical fiber layer 620 can be used to detect parameters that indicate structural nonconformances. In still another illustrative example, optical fiber layer 620 can be connected to optical sensors (not shown). These optical sensors are hardware devices that can detect various types of nonconformances. For example, an optical sensor, such as a pyrometer, can be located relative to the engine of a vehicle to detect the temperature in an engine such as aircraft jet engine.

The illustration of fiber optic mesh 600 is provided as one example implementation and not meant to limit the manner in which other fiber optic meshes can be configured. For example, optical fiber layer 610 can be located elsewhere in the layers. For example, optical fiber layer 610 can be located between layer 602 and layer 604 or can be located under layer 608. In another illustrative example, layer 602 can be a color layer or can be an applique that includes a design. In another illustrative example, one or more optical fiber layers can be present in fiber optic mesh 600 in addition to optical fibers 610 and optical fiber 620.

Figure 7:
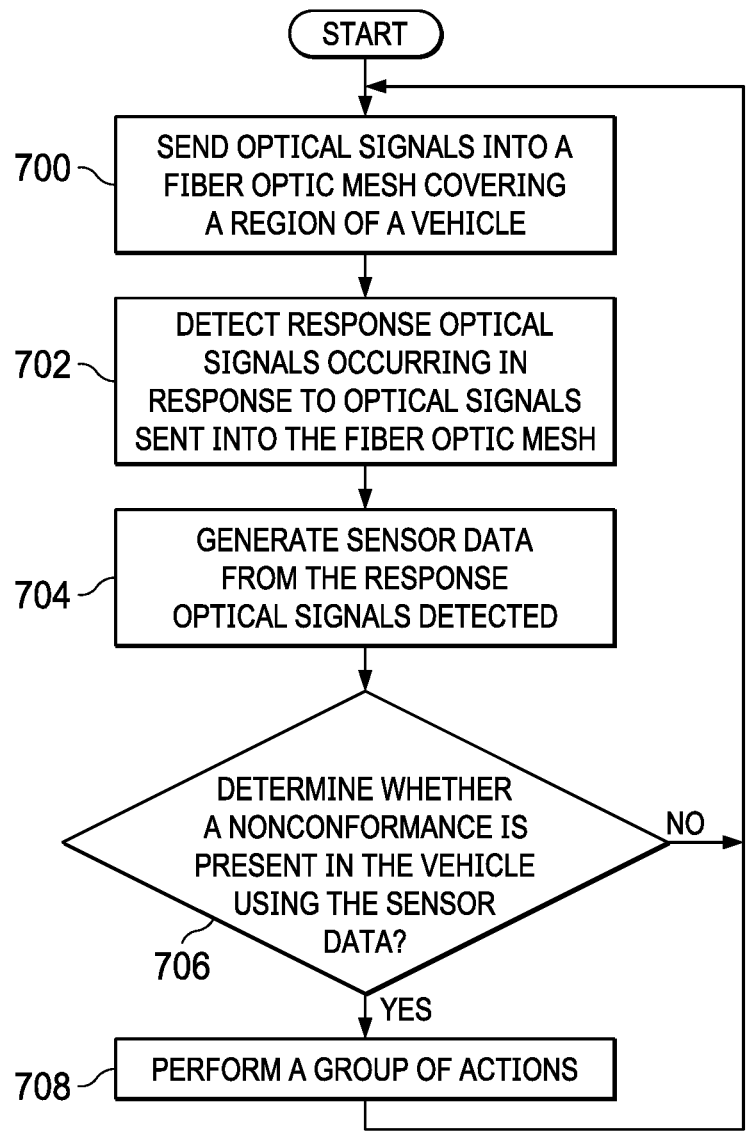
FIG. 7 is an illustration of a flowchart of a process for monitoring a vehicle in accordance with an illustrative embodiment.

Turning next to FIG. 7, an illustration of a flowchart of a process for monitoring a vehicle is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in mesh controller 226 in computer system 212 in FIG. 2.

The process begins by sending optical signals into a fiber optic mesh covering a region of a vehicle (operation 700). The process detects response optical signals occurring in response to optical signals sent into the fiber optic mesh (operation 702). The process generates sensor data from the response optical signals detected (operation 704).

The process determines whether a nonconformance is present in the vehicle using the sensor data (operation 706). If a nonconformance is present, the process performs a group of actions (operation 708). The process returns to operation 700. With reference again to operation 706, if a group of nonconformances is absent, the process also returns to operation 700.

In the illustrative examples, this process can be performed in real time during the operation of aircraft. For example, this process can be implemented in a monitoring system for an aircraft that monitors the aircraft for nonconformances during the flight of aircraft.

Figure 8:
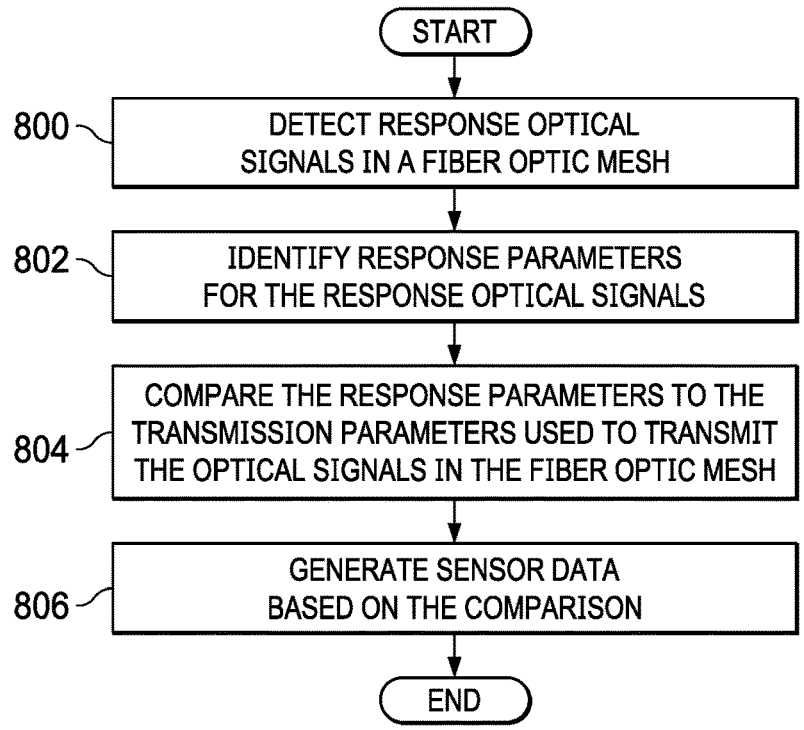
FIG. 8 is an illustration of a flowchart of a process for generating sensor data in accordance with an illustrative embodiment.

With reference next to FIG. 8, an illustration of a flowchart of a process for generating sensor data is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in mesh controller 226 in computer system 212 in FIG. 2.

The process begins by detecting response optical signals in a fiber optic mesh (operation 800). The response optical signals occur in response to optical signals traveling through a fiber optic mesh. Parameters for the optical signals can change in response to nonconformances occurring in the fiber optic mesh.

The process identifies response parameters for the response optical signals (operation 802). In this illustrative example, these response parameters can include at least one of intensity, phase, polarization, wavelength, transit time of light in the fiber optic mesh, or other suitable parameters.

The process compares the response parameters to the transmission parameters used to transmit the optical signals in the fiber optic mesh (operation 804). The process generates sensor data based on the comparison (operation 806). The process terminates thereafter. In this illustrative example, sensor data can include at least one of strain, temperature, pressure, current, or other types of data based on the comparison of the response parameters and the transmission parameters.

Figure 9:
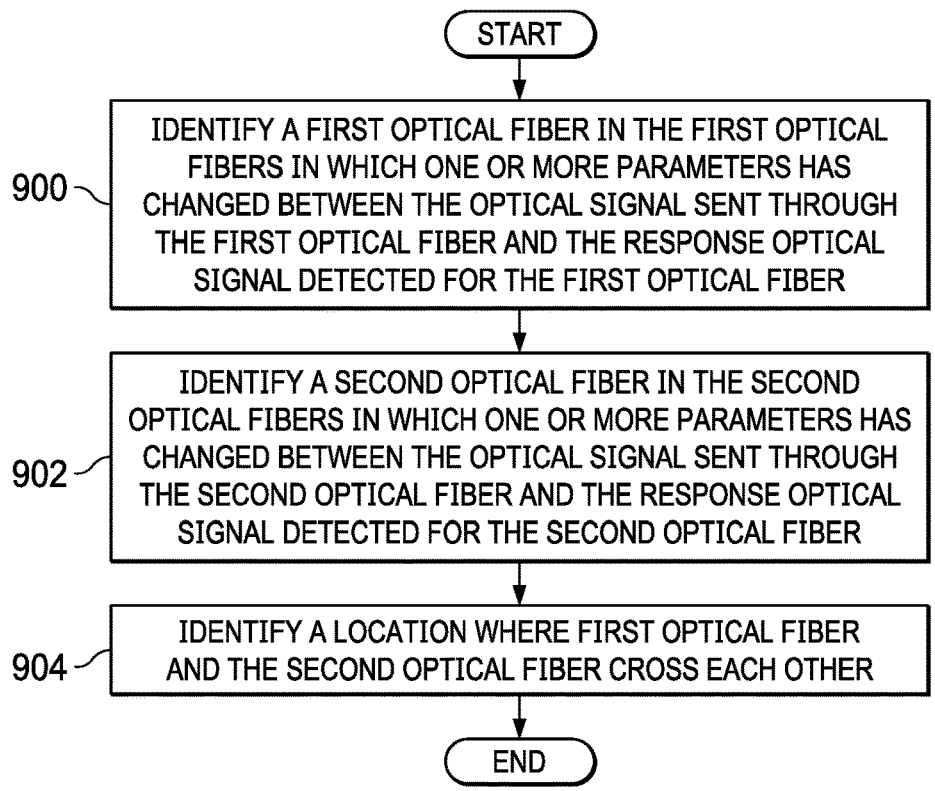
FIG. 9 is an illustration of a flowchart of a process for determining a location of a nonconformance in accordance with an illustrative embodiment.

With reference next to FIG. 9, an illustration of a flowchart of a process for determining a location of a nonconformance is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in mesh controller 226 in computer system 212 in FIG. 2.

In this example, fiber optic mesh is comprised of first optical fibers and second optical fibers in which these optical fibers cross each other.

This process identifies a first optical fiber in the first optical fibers in which one or more parameters has changed between the optical signal sent through the first optical fiber and the response optical signal detected for the first optical fiber (operation 900). The process identifies a second optical fiber in the second optical fibers in which one or more parameters has changed between the optical signal sent through the second optical fiber and the response optical signal detected for the second optical fiber (operation 902).

The process identifies a location where first optical fiber and the second optical fiber cross each other (operation 904). In this illustrative example, a map or model of the first optical fibers and second optical fibers is present. This map or model correlates the crossing of first optical fibers and second optical fibers with locations where the crossing of the optical fibers occurs on the vehicle.

Figure 10:
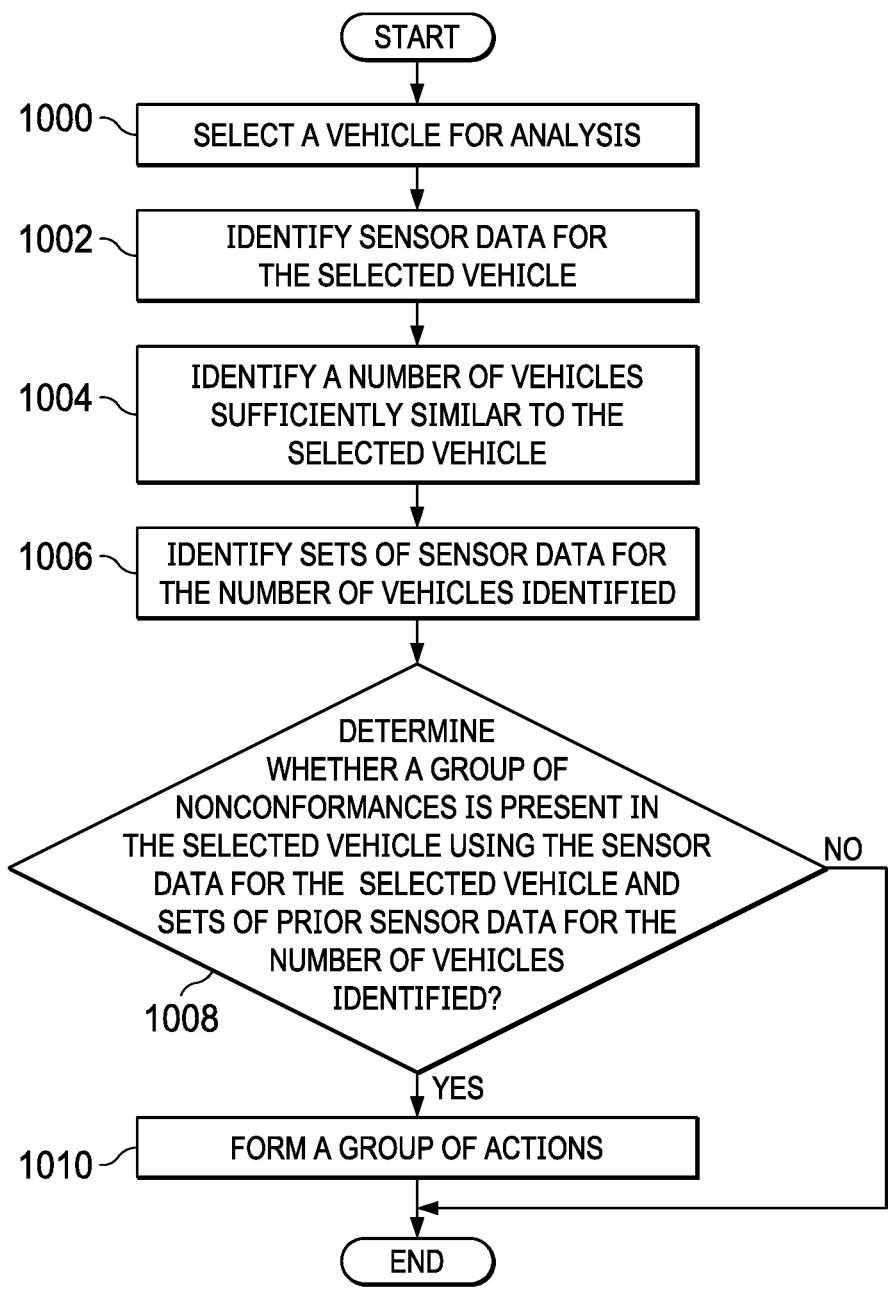
FIG. 10 is an illustration of a flowchart of a process for analyzing sensor data for a vehicle in accordance with an illustrative embodiment.

With reference next to FIG. 10, an illustration of a flowchart of a process for analyzing sensor data for a vehicle is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in vehicle manager 408 in computer system 406 in FIG. 4.

The process begins by selecting a vehicle for analysis (operation 1000). Process identifies sensor data for the selected vehicle (operation 1002). A sensor data can include at least one of current sensor data or prior sensor data received from the vehicle. Current sensor data can be the most current sensor data received from the vehicle. For example, the vehicle can store sensor data during operation of the vehicle the sensor data can be received from a vehicle as the current sensor data when the vehicle is connected to a network. Operation 1002 can identify sensor data generated using the process in FIG. 8. Additionally, the sensor data can also include prior sensor data stored in a historical vehicle database.

The process identifies a number of vehicles sufficiently similar to the selected vehicle (operation 1004). A vehicle can be sufficiently similar to the selected vehicle when nonconformances can occur in both of the vehicles. For example, when the vehicle is aircraft, a similar aircraft can be selected based on at least one of aircraft manufacturer, aircraft type, make, or model.

The process identifies sets of sensor data for the number of vehicles identified (operation 1006). The set of sensor data are located in a repository such as a historical vehicle database.

The process determines whether a group of nonconformances is present in the selected vehicle using the sensor data for the selected vehicle and sets of prior sensor data for the number of vehicles identified (operation 1008). The analysis in operation 1008 can be performed using a number of different types of analysis techniques. In the illustrative examples, the analysis can be implemented in a process such as an artificial intelligence system.

For example, a critical plane analysis can be performed in operation 1008 in which the analysis of stresses restraints encountered by a particular plaintiff material can be performed. This analysis can be used to identify which plane in a structure is less likely to experience more extreme levels of nonconformances. As another example, an artificial intelligence system can employ machine learning to correlate sensor data regarding prior nonconformances in the number of vehicles with sensor data for the selected vehicle that is being analyzed.

In yet another illustrative example, operation 1008 can employ failure modes and effects analysis (FEMA), which is a method that examines potential failures in products or processes. This type of analysis can be employed to evaluate risk management priorities with respect to scheduling management and replacement of parts for the selected vehicle.

If a group of nonconformances is present in the selected vehicle, the process then forms a group of actions (operation 1010). Otherwise, the process terminates. This process can be repeated for any number of vehicles.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed concurrently, or the blocks may sometimes be performed in the reverse order, depending upon the functionality involved. Also, other blocks may be added in addition to the illustrated blocks in a flowchart or block diagram.

Although the different operations in the flowchart in FIG. 7 are described as being performed by mesh controller 226, these operations can be performed in different locations. For example, operation 700, operation 702, and operation 704 can be performed by mesh controller 226. The sensor data can be recorded and sent to a remote location from the vehicle for processing. For example, a computer system in an airline, a maintenance facility, or some other location can perform operation 706 and operation 708. For example, a maintenance facility can determine whether the nonconformance is present and schedule maintenance for the vehicle when a nonconformance is identified using the sensor data received from the vehicle.

For example, in the flowchart in FIG. 8, the sensor data can be the transmission parameters and the response parameters. With this type of implementation, the mesh controller in the computer system receiving a sensor data can analyze parameters to determine measurements such as strain, temperature, pressure, and other quantities.

Figure 11:
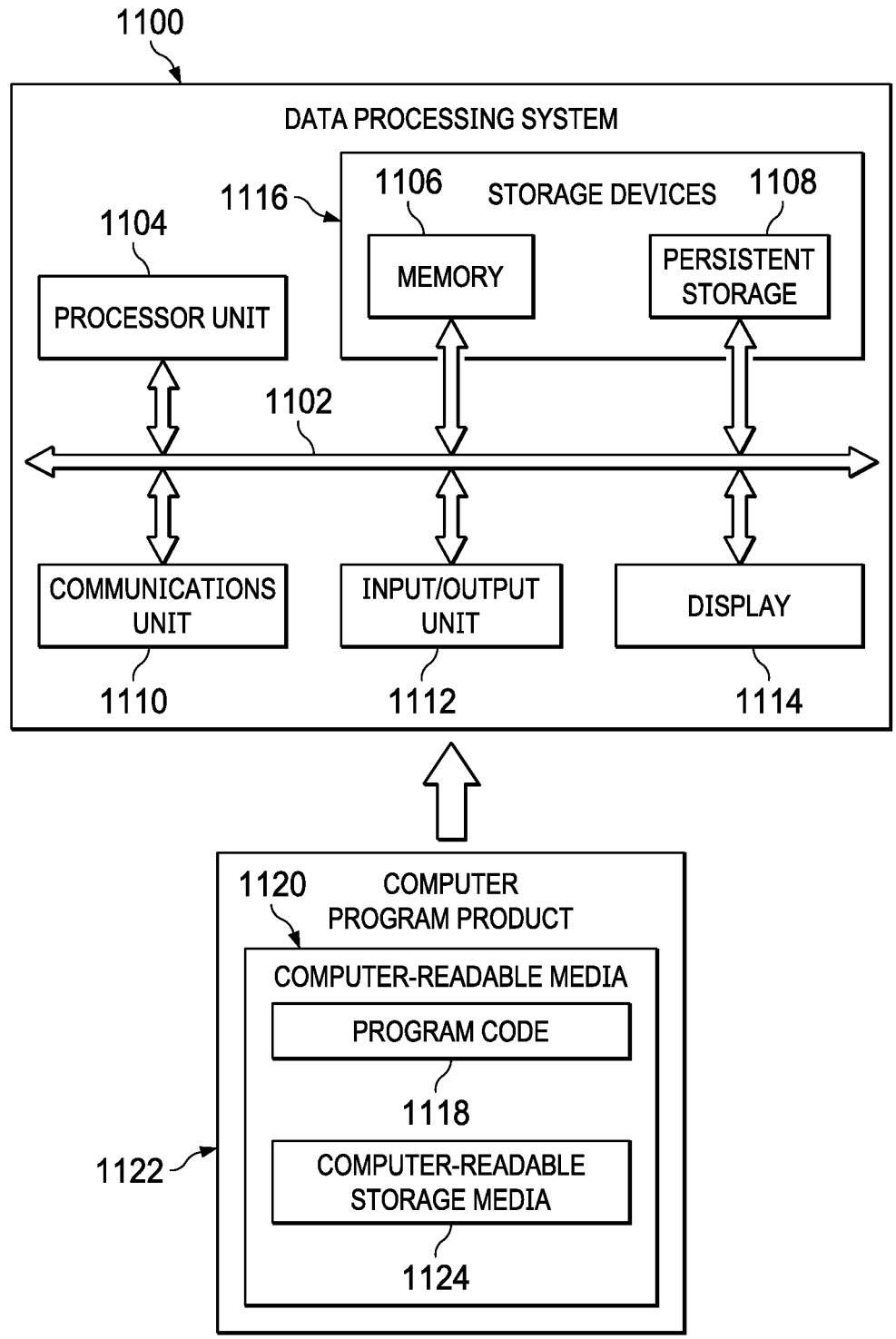
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement server computer 504, server computer 506, and client devices 510 in FIG. 5. Data processing system 1100 can also be used to implement computer system 212 in FIG. 2 and computer system 406 in FIG. 4. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 can take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 can provide a connection for user input through at least one of a keyboard, a mouse, or some other suitable input device. Further, input/output unit 1112 can send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which can be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, can be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Figure 12:
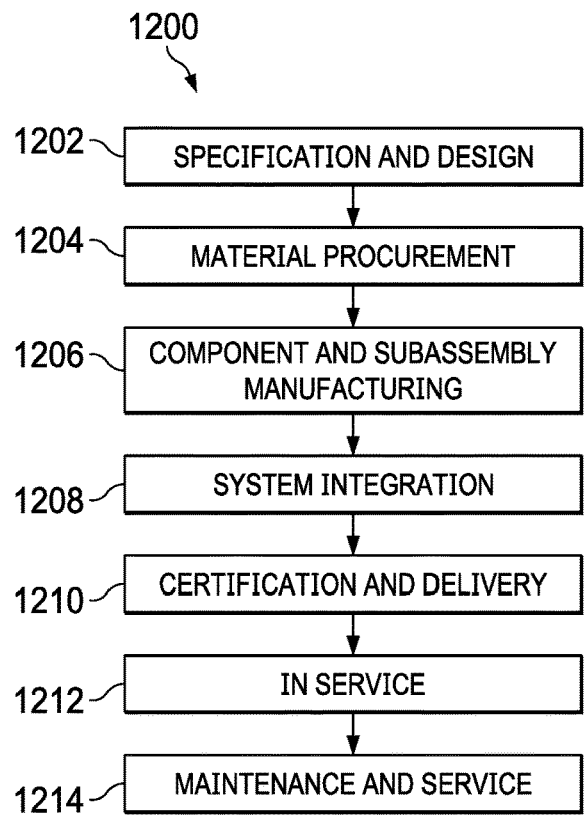
FIG. 12 is an illustration of a block diagram of an aircraft manufacturing and service method depicted in accordance with an illustrative embodiment.
Figure 13:
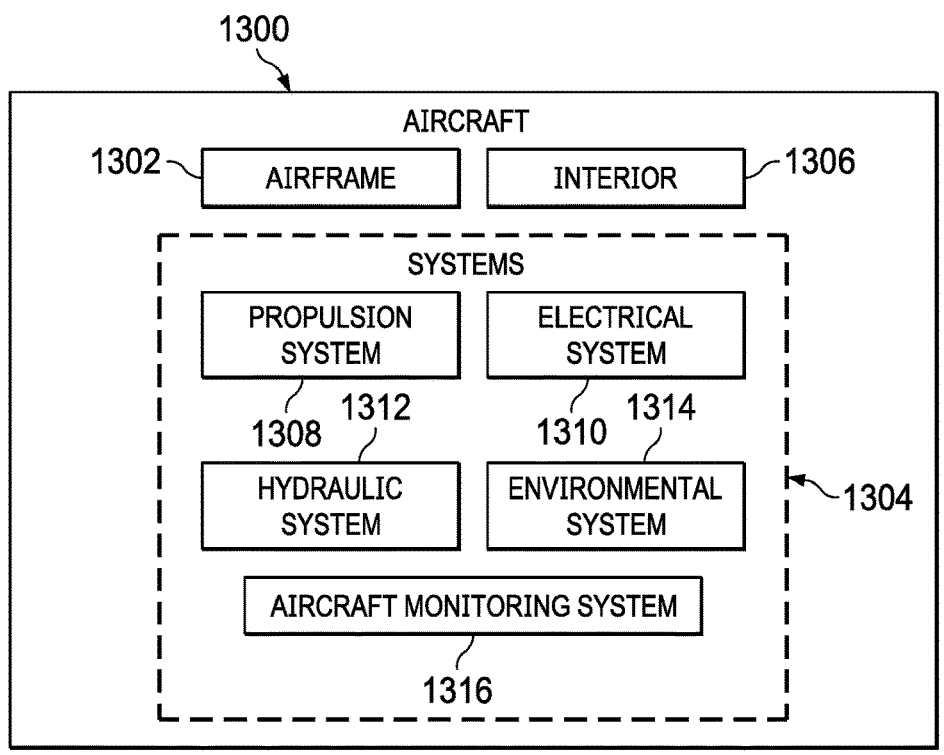
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 can be go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, environmental system 1314, and aircraft monitoring system 1316. Any number of other systems may be included. In the illustrative example, aircraft monitoring system 1316 can be implemented using vehicle monitoring system 204 as depicted in FIG. 2 and FIG. 3.

Although an aerospace example is shown, different illustrative embodiments may be applied to other industries. For example, other illustrative examples can be applied to the automotive industry or shipbuilding industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 can be fabricated or manufactured in a manner similar to components or subassemblies produced while aircraft 1300 is in service 1212 in FIG. 12. As yet another example, one or more apparatus embodiments, method embodiments, or a combination thereof can be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both.

As depicted, aircraft monitoring system 1316 can be used to monitor the health of aircraft 1300 in accordance with an illustrative embodiment. Aircraft monitoring system 1316 can be used during in service 1212 to detect when nonconformances occur. The detection of nonconformances during in service 1212 of aircraft 1300 can reduce maintenance needed for aircraft 1300 during maintenance and service 1214. Further, the use of the monitoring system also can reduce the cost of operation performed for maintenance and service 1214. The use of a number of the different illustrative embodiments may substantially expedite the assembly of aircraft 1300, reduce the cost of aircraft 1300, or both expedite the assembly of aircraft 1300 and reduce the cost of aircraft 1300.

Thus, illustrative examples provide a method, apparatus, and system for monitoring vehicles. For example, vehicle monitoring system can comprise a fiber-optic mesh, an optical transmitter system, an optical receiver system, and a mesh controller. The fiber optic mesh covers a region of a vehicle. The optical transmitter system is connected to the fiber optic mesh, wherein the optical transmitter system operates to send optical signals into the fiber optic mesh. The optical receiver system is connected to fiber optic mesh and operates to detect response optical signals occurring in response to the optical signals sent into the fiber optic mesh by the optical transmitter and generates sensor data from the response optical signals detected. The mesh controller is in communication with the optical transmitter system and the optical receiver system. The mesh controller controls the optical transmitter to send the optical signals; receives sensor data from the optical receiver system during operation of the vehicle; determines whether a nonconformance is present for the aircraft using the sensor data; and performs a number of actions when the nonconformance is present.

The illustrative examples enable reducing the occurrence of unexpected maintenance for vehicles. For example, using the vehicle monitoring system 204 in FIG. 2 can enable reducing aircraft and ground situations. With vehicle monitoring system 204, nonconformances can be detected more quickly as compared to currently used techniques. The monitoring of changes between optical signal sent into a fiber optic mesh and response optical signals can be used to detect at least one of structural nonconformances for environmental nonconformances. By detecting these different types of nonconformances, maintenance or other actions can be performed more quickly or sooner as compared to current techniques for monitoring aircraft.

For example, undesired vibrations, temperatures, or other environmental nonconformances can be detected using a vehicle monitoring system with a fiber optic mesh. By detecting environmental nonconformances, an analysis can be made to predict whether structural nonconformances will occur at some period of time in the future. With this prediction, maintenance can be performed to reduce undesired situations such as an aircraft on ground situation for aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft monitoring system comprising:
   a fiber optic mesh covering a region of an aircraft, wherein the fiber optic mesh comprises a film and optical fibers associated with the film;
   an optical transmitter system connected to the fiber optic mesh, wherein the optical transmitter system operates to send optical signals into the fiber optic mesh;
   an optical receiver system connected to fiber optic mesh, wherein the optical receiver system operates to detect response optical signals occurring in response to the optical signals sent into the fiber optic mesh by the optical transmitter system and generate sensor data from the response optical signals detected; and
   a computer system in communication with the optical transmitter system and the optical receiver system, wherein the computer system controls the optical transmitter system to send the optical signals into the fiber optic mesh; receives sensor data from the optical receiver system during operation of the aircraft; determines whether a group of nonconformances is present for the aircraft using the sensor data; and performs a group of actions when the group of nonconformances is present, wherein the group of actions is selected from at least one of scheduling maintenance for the aircraft, sending the message to a ground station, sending the message to an airline, sending the message to a maintenance facility, generating an entry in an aircraft data log, or generating an alert.

2. The aircraft monitoring system of claim 1, wherein the computer system determines whether a group of nonconformances is present in the aircraft using the sensor data.

3. The aircraft monitoring system of claim 2, wherein the computer system schedules maintenance for the aircraft when the group of nonconformances is present.

4. The aircraft monitoring system of claim 2, wherein in determining whether the group of nonconformances is present in the aircraft using the sensor data, the computer system determines whether the group of nonconformances is present on the aircraft at a group of locations using the sensor data.

5. The aircraft monitoring system of claim 2, wherein the computer system determines whether the group of nonconformances is present in a structure in the aircraft using the sensor data.

6. The aircraft monitoring system of claim 2, wherein the group of nonconformances is selected from at least one of crack, a delamination, a structural flaw, wear, a dent, a vibration, a strain, a stress, a temperature, or a humidity level.

7. The aircraft monitoring system of claim 1, wherein the film comprises at least one of an adhesive film, a tape, a prepreg, a polymer film, or a synthetic polymer film.

8. The aircraft monitoring system of claim 1, wherein the optical fibers comprises:
first optical fibers parallel to each other; and
second optical fibers parallel to each other, wherein the first optical fibers intersect the second optical fibers.

9. The aircraft monitoring system of claim 1, wherein the region is selected from at least one of a wing, a fuselage, a vertical stabilizer, a horizontal stabilizer, a cargo area, a control surface, or an entire surface of the aircraft.

10. The aircraft monitoring system of claim 1, wherein the sensor data comprises at least one of a strain, a temperature, a vibration, a pressure, or a sound.

11. A vehicle monitoring system comprising:
a fiber optic mesh covering a region of a vehicle, wherein the fiber optic mesh comprises a film and optical fibers associated with the film;
optical transmitter system connected to the fiber optic mesh, wherein the optical transmitter system operates to send optical signals into the fiber optic mesh;
optical receiver system connected to fiber optic mesh, wherein the optical receiver system operates to detect response optical signals occurring in response to the optical signals sent into the fiber optic mesh by the optical transmitter system and generates sensor data from the response optical signals detected; and
a mesh controller in communication with the optical transmitter system and the optical receiver system, wherein the mesh controller controls the optical transmitter system to send the optical signals into the fiber optic mesh; receives sensor data from the optical receiver system; determines whether a group of nonconformances is present for the vehicle using the sensor data; and performs a group of actions when the group of nonconformances is present, wherein the group of actions is selected from at least one of scheduling maintenance for the vehicle, sending the message to a ground station, sending the message to an airline, sending the message to a maintenance facility, generating an entry in an aircraft data log, or generating an alert.

12. The vehicle monitoring system of claim 11, wherein in performing the group of actions when the group of nonconformances is present, the mesh controller schedules maintenance for the vehicle when the group of nonconformances is present.

13. The vehicle monitoring system of claim 11, wherein in determining whether the group of nonconformances is present in the vehicle using the sensor data, the mesh controller determines whether the group of nonconformances is present on the vehicle at a group of locations using the sensor data.

14. The vehicle monitoring system of claim 11, wherein the group of nonconformances is selected from at least one of a structural nonconformance or an environmental nonconformance.

15. The vehicle monitoring system of claim 11, wherein the film comprises at least one of an adhesive film, a tape, a prepreg, a polymer film, or a synthetic polymer film.

16. The vehicle monitoring system of claim 11, wherein the optical fibers comprises:
first optical fibers parallel to each other; and
second optical fibers parallel to each other, wherein the first optical fibers intersect the second optical fibers.

17. The vehicle monitoring system of claim 11, wherein the fiber optic mesh comprises:
structural layers; and
optical fiber layers.

18. The vehicle monitoring system of claim 11, wherein the region is selected from at least one of a body, a door, wing, a fuselage, a vertical stabilizer, a horizontal stabilizer, a cargo area, a control surface, or an entire surface of the vehicle.

19. The vehicle monitoring system of claim 11, wherein the sensor data comprises at least one of a strain, a temperature, a vibration, a pressure, or a sound.

20. The vehicle monitoring system of claim 11, wherein the vehicle is selected from a group comprising a mobile platform, an aircraft, a surface ship, a tank, a personnel carrier, a train, a spacecraft, a submarine, a bus, and an automobile.

21. A monitoring system comprising:
a computer system; and
a vehicle manager located in the computer system, wherein the vehicle manager operates to receive sets of sensor data from multiple vehicles in which the vehicles generate the sets of sensor data from response optical signals detected in fiber optic meshes on the vehicles, determine whether a group of nonconformances is present in the vehicles, and perform a group of actions when the group of nonconformances is present, wherein the group of actions is selected from at least one of scheduling maintenance for the vehicle, sending the message to a ground station, sending the message to an airline, sending the message to a maintenance facility, generating an entry in an aircraft data log, or generating an alert.

22. The monitoring system of claim 21 further comprising:
a historical vehicle database, wherein profiles for the vehicles are stored in the historical vehicle database, wherein the profiles are generated from prior sets of sensor data generated from prior response optical signals detected in the fiber optic meshes on the vehicles.

23. The monitoring system of claim 22, wherein the vehicle manager uses the sets of sensor data and the prior sets of sensor data in the historical vehicle database in determining whether a group of nonconformances is present.

24. The monitoring system of claim 22, wherein the vehicles are of a same type and wherein the vehicle manager uses the sets of sensor data and the prior sets of sensor data in the historical vehicle database in predicting a group of nonconformances for the vehicles.

25. The monitoring system of claim 22, wherein in using the sets of sensor data and the prior sets of sensor data in the historical vehicle database in determining whether a group of nonconformances is present, the vehicle manager analyzes the sets of sensor data and the prior sets of sensor data to determine a trend of the group of nonconformances for the vehicles.

26. A method for monitoring a vehicle, the method comprising:
    sending optical signals into a fiber optic mesh covering a region of the vehicle, wherein the fiber optic mesh comprises a film and optical fibers associated with the film;
    detecting response optical signals occurring in response to optical signals sent into the fiber optic mesh;
    determining, by a computer system, whether a group of nonconformances is present in the vehicle using sensor data generated from the response optical signals detected; and
    performing a group of actions when the group of nonconformances is present, wherein the group of actions is selected from at least one of scheduling maintenance for the vehicle, sending the message to a ground station, sending the message to an airline, sending the message to a maintenance facility, generating an entry in an aircraft data log, or generating an alert.

27. The method of claim 26, performing the group of actions when the group of nonconformances is present comprises:
    scheduling maintenance for the vehicle when the group of nonconformances is present.

28. The method of claim 26, determining whether the group of nonconformances is present in the vehicle using the sensor data comprises:
    determining whether the group of nonconformances is present on the vehicle at a group of locations using the sensor data.

29. The method of claim 26, wherein the group of nonconformances is selected from at least one of a structural nonconformance or an environmental nonconformance.

30. The method of claim 26, wherein the fiber optic mesh further comprises first optical fibers and second optical fibers associated with the film, wherein the first optical fibers parallel to each other, the second optical fibers parallel to each other, and the first optical fibers intersect the second optical fibers.

31. The method of claim 26, wherein the film comprises at least one of an adhesive film, a tape, a prepreg, a polymer film, or a synthetic polymer film.

32. The method of claim 26, wherein the region is selected from at least one of a body, a door, wing, a fuselage, a vertical stabilizer, a horizontal stabilizer, a cargo area, a control surface, or an entire surface of the vehicle.

33. The method of claim 26, wherein the sensor data comprises at least one of a strain, a temperature, a vibration, a pressure, or a sound.

34. The method of claim 26, wherein the vehicle is selected from a group comprising a mobile platform, an aircraft, a surface ship, a tank, a personnel carrier, a train, a spacecraft, a submarine, a bus, and an automobile.

35. A method for monitoring a vehicle, the method comprising:
    receiving, by a computer system, sensor data generated from response optical signals detected in a fiber optical mesh covering a region of the vehicle during operation of the vehicle;
    determining, by the computer system, whether a group of nonconformances is present in the vehicle using the sensor data generated from the response optical signals detected; and
    performing a group of actions when the group of nonconformances is present, wherein the group of actions is selected from at least one of scheduling maintenance for the vehicle, sending the message to a ground station, sending the message to an airline, sending the message to a maintenance facility, generating an entry in an aircraft data log, or generating an alert.

36. The aircraft monitoring system of claim 2, wherein the nonconformances modify parameters of light in the optical signals, wherein the parameters include at least one of intensity, phase, polarization, wavelength, or transit time of light in the fiber optic mesh.

37. The vehicle monitoring system of claim 11, Wherein the nonconformances modify parameters of light in the optical signals, wherein the parameters include at least one of intensity, phase, polarization, wavelength, or transit time of light in the fiber optic mesh.

38. The method of claim 35, wherein the nonconformances modify parameters of light in the optical signals, wherein the parameters include at least one of intensity, phase, polarization, wavelength, or transit time of light in the fiber optic mesh.

* * * * *